United States Patent [19]
Abe et al.

[11] Patent Number: 5,048,629
[45] Date of Patent: Sep. 17, 1991

[54] REAR WHEEL STEERING METHOD FOR A FOUR WHEEL STEERING VEHICLE

[75] Inventors: Masaru Abe; Takashi Kohata, both of Wako, Japan

[73] Assignee: Honda Giken Kogyo Kabushiki Kaisha, Tokyo, Japan

[21] Appl. No.: 547,354

[22] Filed: Jul. 3, 1990

[30] Foreign Application Priority Data

Jul. 4, 1989 [JP] Japan .................... 1-171194

[51] Int. Cl.⁵ .................... B62D 5/06; B62D 7/06
[52] U.S. Cl. .................... 180/140; 180/79.1; 364/424.05; 280/91
[58] Field of Search .............. 180/140, 142, 143, 79.1; 280/91; 364/424.1, 424.05

[56] References Cited

U.S. PATENT DOCUMENTS

| | | | |
|---|---|---|---|
| 4,566,710 | 1/1986 | Furukawa et al. ............. | 180/140 X |
| 4,687,216 | 8/1987 | Kawamoto et al. ............ | 280/91 |
| 4,778,023 | 10/1988 | Sugasawa ................... | 280/91 X |
| 4,796,904 | 1/1989 | Kubo et al. ................ | 280/91 |

*Primary Examiner*—Charles A. Marmor
*Assistant Examiner*—Kevin Hurley
*Attorney, Agent, or Firm*—Armstrong, Nikaido, Marmelstein, Kubovcik & Murray

[57] ABSTRACT

In a four-wheel steering system for steering front and rear wheels of a vehicle in opposite directions in a low vehicle speed range, a rear wheel steering method steers the rear wheels more greatly in a predetermined low vehicle speed range in which a vehicle is usually steered by large angles than in a very low vehicle speed range lower than the predetermined range. The method insures a small turn of the vehicle while suppressing a change in the radius of a turn relative to the operation of a steering wheel immediately after the start of the vehicle.

2 Claims, 3 Drawing Sheets

REAR WHEEL STEERING METHOD FOR A FOUR WHEEL STEERING VEHICLE

BACKGROUND OF THE INVENTION

The present invention relates to a rear wheel steering method for a vehicle of the type steering rear wheels when front wheels are steered by a steering wheel and, more particularly, to a method of steering rear wheels in a low vehicle speed range in which front and rear wheels are steered in opposite directions to each other.

Some modern vehicles are loaded with a four wheel steering system in which rear wheels are steered together with front wheels. Specifically, when the operator of this kind of vehicle steers the front wheels by a certain angle via the steering wheel, the steering system steers the rear wheels by a predetermined steering ratio matching the instantaneous vehicle speed. In the four wheel steerage vehicle, steering the front and rear wheels in opposite directions to each other in a low vehicle speed range is successful in enhancing the small turn capability and, therefore, the manageability of the vehicle. On the other hand, steering the front and rear wheels in the same directions in a high speed range is successful in promoting the ease of steering operations and stability. Therefore, the steering ratio of the front and rear wheels of a vehicle of the type concerned is usually set such that the front and rear wheels are steered in opposite phases in a low vehicle speed range and in the same phase in a high vehicle speed range. Further, the steering ratio is varied smoothly in matching relation to the varying vehicle speed in order to prevent the steering angle from being sharply changed between the high and low speed ranges.

It has been customary with the above-described type of vehicle to reduce, assuming that the steering ratio which gives the front and rear wheels the opposite phases is positive, the steering ratio sequentially with the increase in vehicle speed, as disclosed in Japanese Patent Laid-Open Publication 11173/1982. For example, assume that the vehicle is started with the front wheels thereof being held in a certain angular position. Then, the rear wheels are steered by the greatest angle in the opposite direction to the front wheels when the vehicle speed is zero, and the steering angle of the rear wheels decreases with the increase in vehicle speed. On the acceleration of the vehicle to a speed of 35 kilometers per hour or so, the steering angle of the rear wheels is reduced to zero. As the vehicle is further accelerated, the rear wheels are steered in the same direction as the front wheels with the steering angle thereof being increased little by little.

Generally, a vehicle shows a tendency to understeer, i.e., the radius of a turn increases with the increase in vehicle speed when the vehicle is accelerated while being steered by a certain angle. Although this tendency is not noticeable in a low vehicle speed range such as just after the start of the vehicle, it grows noticeable little by little as the vehicle speed increases to about 10 kilometers per hour. Therefore, from the manageability standpoint, it is preferable that the radius of a turn be maintained small against the tendency to understeer by steering the rear wheels by a great angle. With the conventional scheme which reduces the steering ratio monotonously with the increase in vehicle speed, it is necessary to provide the steering ratio with a greater maximum value, i.e., to set a sufficiently great steering ratio in a very low vehicle speed range. However, the increase in steering ratio directly translates into the increase in the change of the radius of a turn relative to the operation of the steering wheel. Furthermore, one often starts a vehicle from a standstill by turning the steering wheel by a great angle. In such a case, should the rear wheels be steered greatly in the opposite direction to the front wheels, the locus of the rear wheels would project to the outside. For this reason, the steering ratio should not be increased beyond a certain value in the very low vehicle speed range just after the start of the vehicle.

Since the steering ratio available in the very low vehicle speed range is limited as stated above, the prior art system which reduces the steering ratio in a range higher than the very low vehicle speed range cannot suppress the increase in the radius of a turn ascribable to acceleration and, therefore, fails to implement sufficient manageability. It has been proposed to maintain the steering ratio at a constant maximum value until the vehicle speed increases to a certain degree. This, however, cannot improve the manageability of the vehicle satisfactorily because the maximum steering ratio is limited.

In the light of the above, the steering ratio of the rear wheels to the front wheels may be maintained small until the vehicle travels a predetermined distance after the start from a standstill, as taught in Japanese Patent Laid-Open Publication 176867/1985. Then, even when the steering wheel is turned by a great angle immediately after the start of the vehicle, the steering angle of the rear wheels will be maintained small to prevent the rear portion of the vehicle from projecting to the outside. As the vehicle travels by the predetermined distance to a position where the above-mentioned projection does not matter, the rear wheels are steered by a predetermined steering ratio. Hence, if this steering ratio is selected to have a relatively large value, sharp small turns will be insured thereafter. However, the problem with this scheme is that since the steering angle of the rear wheels cannot reach a predetermined value until the vehicle runs the predetermined distance, the small turn capability of the vehicle is degraded for some time after the start. Specifically, when the operator parked the vehicle starts it by turning the steering wheel and then turns the steering wheel in the opposite direction by a great angle, the vehicle cannot make a small turn. This is undesirable from the manageability standpoint. Another problem is that when the vehicle is steered while being started relatively rapidly, the radius of a turn cannot be prevented from increasing. In addition, although the vehicle may be operated at a constant speed by a constant angle of the steering wheel, the yaw rate suddenly changes when the predetermined distance is reached.

SUMMARY OF THE INVENTION

It is therefore an object of the present invention to provide a rear wheel steering method for a four wheel steerage vehicle which improves the manageability of a vehicle in a low vehicle speed range while insuring smooth steering of the vehicle.

In accordance with the present invention, in a rear wheel steering method for a four wheel steerage vehicle which steers, in a low vehicle speed range, rear wheels by a steering ratio which is predetermined in matching relation to a vehicle speed, the rear wheels are steered, in a predetermined low vehicle speed range, by a first steering ratio greater than a second steering ratio which is particular to a specified vehicle speed range which is lower than the predetermined low vehicle speed range.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
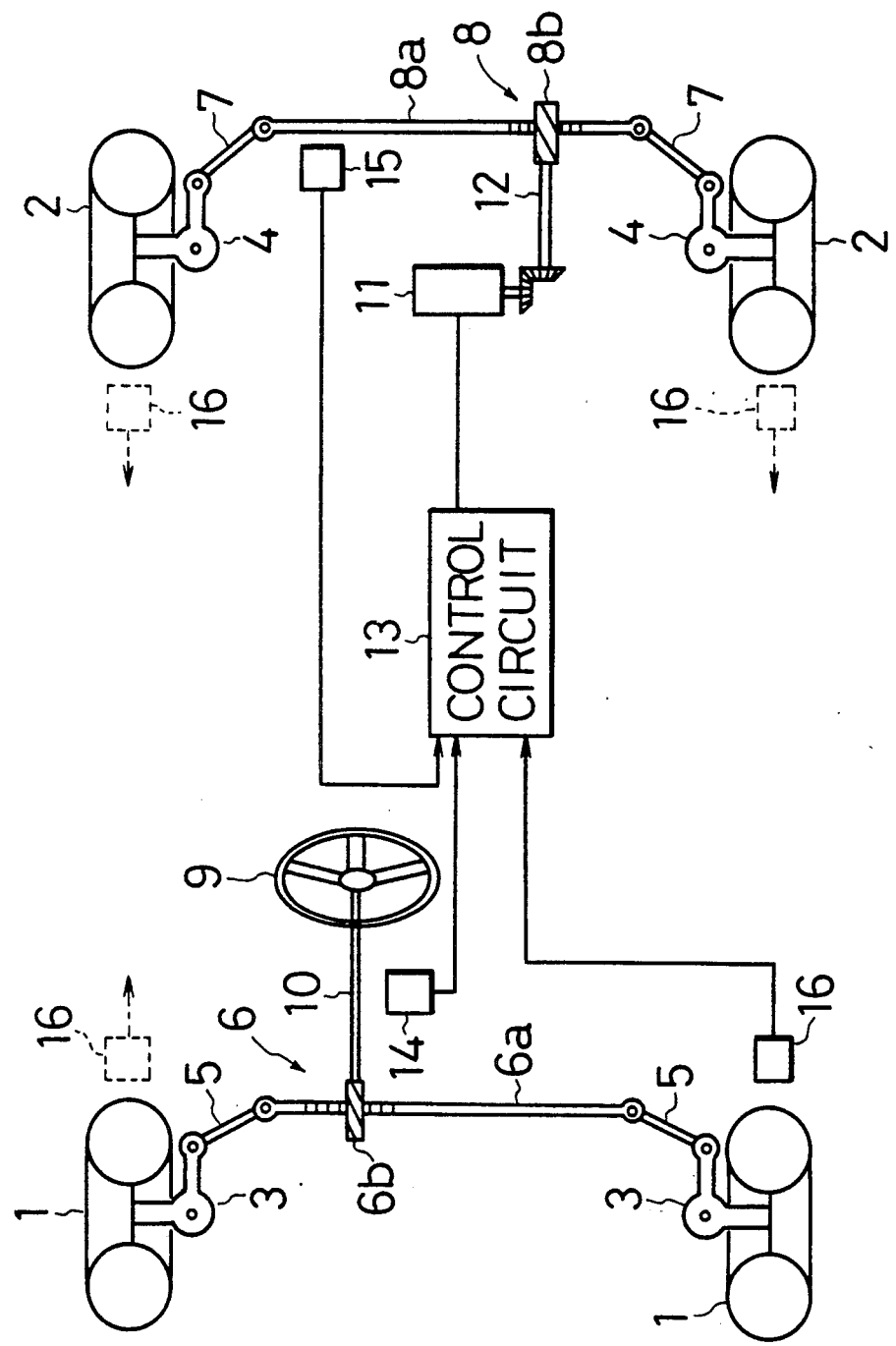
FIG. 1 is a schematic view showing a steering system of a four wheel steerage vehicle to which a rear wheel steering method of the present invention is applied.

Referring to FIG. 1 of the drawings, a steering system of a four wheel steerage vehicle to which the present invention is applicable is shown. As shown, knuckle arms 3 and 4 are mounted on front wheels 1 and rear wheels 2, respectively. The knuckle arms 3 each are connected to a corresponding tie rod 5 which is in turn connected to a rack shaft 6a included in a front steering gear mechanism 6. Likewise, the knuckle arms 4 each is connected to a corresponding tie rod 7 which is in turn connected to a rack shaft 8a included in a rear steering gear mechanism 8. A steering shaft 10 extends from a steering wheel 9 and has a pinion 6b at one end thereof. The rack shaft 6a of the front steering gear mechanism 6 is held in mesh with the pinion 6b. A steering shaft 12 has a pinion 8b at one end thereof and is driven by a motor 11. The rack shaft 8a of the rear steering gear mechanism 8 is held in mesh with the pinion 8b. In this configuration, the front wheels 1 are steered by the steering wheel 9, while the rear wheels 2 are steered by the motor 11.

The motor 11 is controlled by an output signal of an electronic control circuit 13. Applied to the control circuit 13 are output signals of a front steering angle sensor 14, a rear steering angle sensor 15, and a wheel speed sensor 16. The front steering angle sensor 14 senses the rotation angle of the steering shaft 10 which is rotated by the steering wheel 9. The rear steering angle sensor 15 is responsive to the displacement of the rack shaft 8a which is driven by the pinion 8b of the rear steering mechanism 8. The wheel speed sensor 16 is responsive to the rotation speed of the front and rear wheels 1 and 2. The control circuit 13 calculates the instantaneous steering angle $\theta F$ of the front wheels 1, the instantaneous steering angle $\theta R$ of the rear wheels 2, and the instantaneous vehicle speed V in response to the output signals of the sensors 14, 15 and 16.

Figure 2:
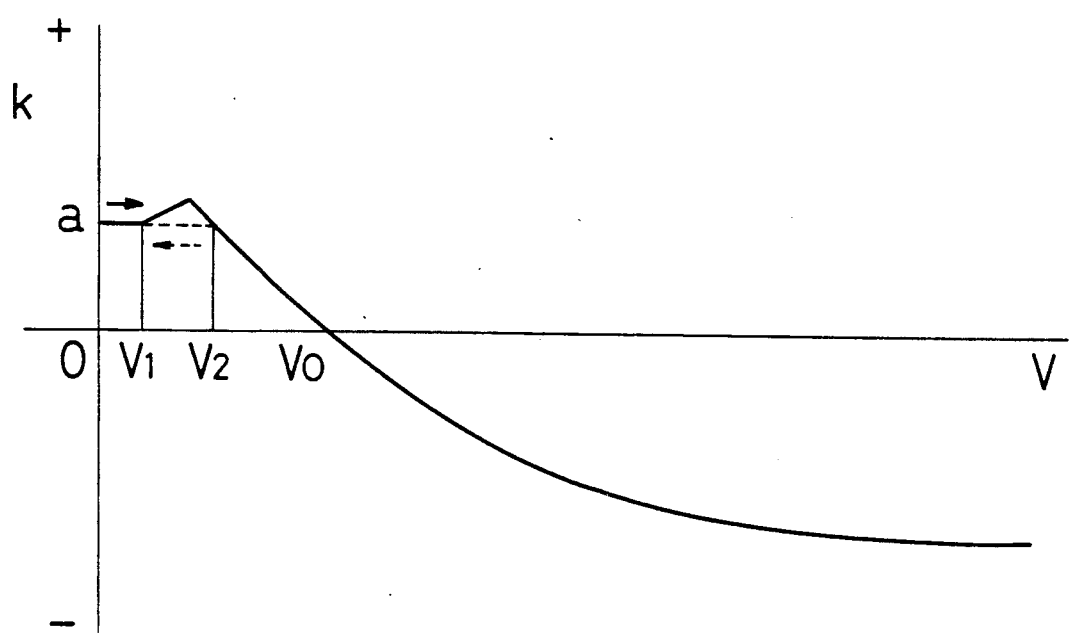
FIG. 2 is a graph indicating a steering ratio map which is stored in an electronic control circuit included in the system of FIG. 1.

The control circuit 13 stores a map representative of a relation between the vehicle speed V and the steering ratio k, i.e., the ratio of the steering angle $\theta R$ to the steering angle $\theta F$, as shown in FIG. 2. The map is such that when the vehicle speed V lies in a very low range which is zero to $V_1$, the steering ratio k remains in a positive constant value a, and when it exceeds $V_1$ the steering ratio k once increases and then gradually decreases to negative values across the zero level. The value a of the steering ratio k in the very low speed range is so selected as to provide the rear wheels 2 with a steering angle of about 5 degrees when the front wheels 1 are caused into maximum swing by the steering wheel 9. The vehicle speed $V_1$ at which the steering ratio k begins to increase beyond a is selected to be, for example, 10 kilometers per hour or so which causes the tendency to understeer begins to appear. Further, a vehicle speed $V_a$ at which the steering ratio k once increased above a decreases below the same is selected to be the speed at which during acceleration the motion of the vehicle becomes dynamically active, e.g. 15 to 25 kilometers per hour.

It will be seen that when the vehicle speed V lies in the predetermined range between $V_1$ and $V_a$, the steering ratio of the front and rear wheels 1 and 2 is maintained greater than the value a particular to the very low speed range. The steering ratio k gradually decreases from the maximum value in the above-mentioned predetermined range until it reaches zero at a vehicle speed $V_o$ such as 35 kilometers per hour. As the vehicle speed further increases, the absolute value of the steering ratio k increases on the negative side.

Figure 3:
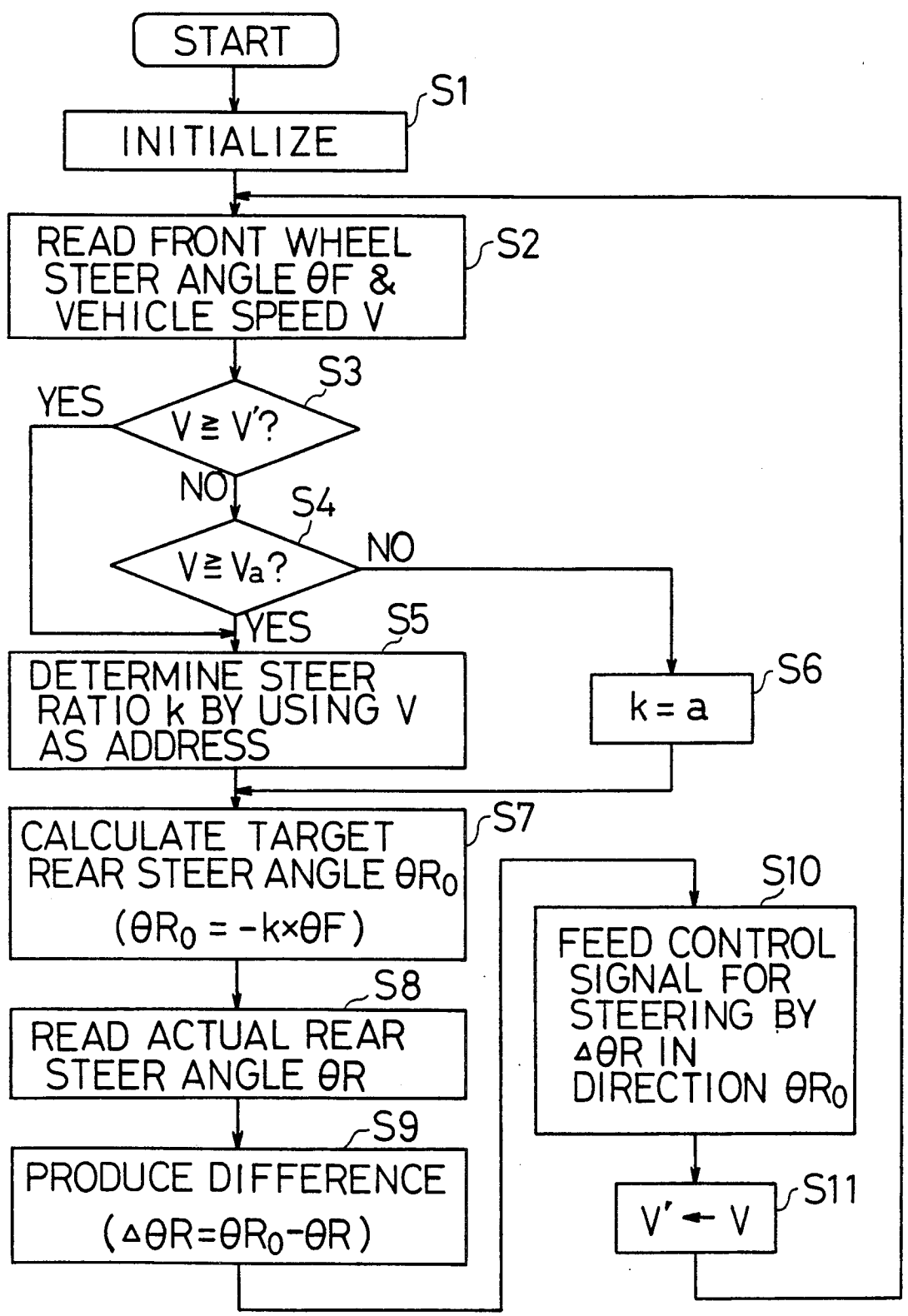
FIG. 3 is a flowchart demonstrating a specific operation of the electronic control circuit.

Referring to FIG. 3, a specific operation of the electronic control circuit 13 will be described. The control circuit 13 starts controlling the steering system when the vehicle is started to run. First, in a step S1, the control circuit 13 initializes the system by resetting various parameters to zero. Then, the control circuit 13 reads the front steering angle $\theta F$ and the vehicle speed V (step S2) and, thereafter, compares the read vehicle speed V with a vehicle speed V' set last time by the same control flow (step S3). Immediately after the vehicle has started to run, the vehicle speed V' is zero due to the initialization.

If the instantaneous vehicle speed V is lower than the last vehicle speed V' as determined in the step S3, the control circuit 13 compares the vehicle speed V with the predetermined vehicle speed $V_a$ by determining that the vehicle is in deceleration (step S4). The predetermined vehicle speed $V_a$ is the speed at which the steering ratio k becomes smaller than a, as stated earlier with reference to FIG. 2. If the vehicle speed V is higher than the vehicle speed V' as determined in the step S3, meaning that the vehicle is in acceleration, the control circuit 13 references the map of FIG. 2 by using the instantaneous vehicle speed V as an address and thereby selects a particular steering ratio k (step S5). Further, if the vehicle speed V is equal to or higher than the predetermined vehicle speed $V_a$ as determined in the step S4, the control circuit 13 also selects a particular steering ratio k (step S5). If the vehicle speed V is lower than the vehicle speed $V_a$, the control circuit 13 selects the constant value a as the steering ratio k (step S6).

After the control circuit 13 has determined the steering ratio k as stated above, it multiplies the steering ratio k by the front steering angle $\theta F$ having been read in the step S2 to produce a target rear steering angle $\theta R_o$ (step S7). Then, the control circuit 13 reads the instantaneous actual steering angle $\theta R$ of the rear wheels 2 (step S8) and produces a difference $\Delta\theta R$ between the target steering angle $\theta R_o$ and the actual steering angle $\theta R$ (step S9). Thereupon, the control circuit 13 outputs a control signal for steering the rear wheels 2 such that the difference $\Delta\theta R$ decreases to zero (step S10). Subsequently, the control circuit 13 sets the vehicle speed V of this moment as the last vehicle speed V' (step S11). Then, the program returns to the step S2.

A vehicle with the above-described four wheel steering system will be operated as follows.

Assume that the operator parked the vehicle has starts it while turning the steering wheel 9 clockwise by a great angle. Then, the front wheels 1 are steered rightward by a great angle by the steering wheel 9. The control circuit 13 reads the resulting steering angle $\theta F$ via the front steering angle sensor 14. At the same time, the control circuit 13 reads the instantaneous vehicle speed V via the wheel speed sensor 16.

Immediately after the start of the vehicle, the last vehicle speed V' is zero and, therefore, the instantaneous vehicle speed V is higher than the last speed V'. In this condition, the control circuit 13 determines that the vehicle is in acceleration and selects a particular steering ratio k matching the vehicle speed V. Since the vehicle speed just after the start of the vehicle is extremely low, the control circuit 13 selects the constant value a as the steering ratio k. Then, the control circuit 13 calculates the target steering angle $\theta R_o$ of the rear wheels 2 on the basis of the steering ratio a and front steering angle $\theta F$. Subsequently, the control circuit 13 delivers a control signal to the motor 11 for steering the rear wheels 2 to the target steering angle $\theta R_o$. Since the steering ratio a is positive, the rear wheels 2 are steered in the opposite direction to the front wheels 1. In this instance, the steering angle of the rear wheels 2 is not greater than 5 degrees at maximum because the steering ratio k remains in the constant value a. As a result, the vehicle is easily steered rightward by a great angle with the change in the radius of a turn being adequately suppressed, while the rear portion of the vehicle is prevented from projecting to the outside.

As the vehicle is accelerated above the vehicle speed $V_1$, the radius of a turn tends to increase, i.e., the tendency to understeer appears due to the increasing centrifugal force acting on the vehicle. Nevertheless, since the steering ratio k set at this moment is greater than the value a particular to the very low speed range, the rear wheels 2 are steered by a great angle even if the steering wheel 9 is maintained in the same angular position. As a result, the vehicle turns with a small radius and is, therefore, free from understeer. This is successful in insuring small sharp turns in a vehicle speed range in which a vehicle is usually steered by great angles.

When the vehicle is further accelerated to exceed the vehicle speed $V_a$, the steering angle of the rear wheels 2 is sequentially reduced. As soon as the vehicle reaches the vehicle speed $V_o$, the steering angle becomes zero. On the further acceleration of the vehicle, the steering ratio k becomes negative with the result that the rear wheels 2 are steered in the same direction as the front wheels 1. The operation described so far is similar to the conventional four wheel steerange vehicle.

In the event of deceleration of the vehicle, the steering ratio k is selected in matching relation to the vehicle speed V on the basis of the map, FIG. 2, until the vehicle speed V decreases to $V_a$. However, as soon as the vehicle speed is lowered below $V_a$, the steering ratio k is controlled to the constant value a as in the very low speed range (step S6, FIG. 3). This prevents the rear wheels 2 from being steered excessively and thereby inhibits the vehicle from turning sharply in the low speed range.

Further, the steering ratio k is increased in a particular vehicle speed range immediately preceding the vehicle speed $V_a$ at which the motion of the vehicle becomes dynamically active. Hence, even if the steering wheel 9 is held in the same angular position, the yaw rate of the vehicle is prevented from changing during acceleration and deceleration. This insures easy steering and stable operation.

In the illustrative embodiment, during deceleration of the vehicle, the steering ratio k is maintained in the constant value a in the particular low vehicle speed range. Alternatively, an exclusive map for deceleration may be used to cause the steering ratio k to approach the constant value a little by little in such a particular range.

While the foregoing description has concentrated on a vehicle of the type steering front and rear wheels thereof in the same phase in a high vehicle speed range, the present invention is also practicable with a vehicle of the type steering only front wheels in a high vehicle sped range and steering front and rear wheels in opposite phases in a low vehicle speed range. Generally, the alternative type of vehicle is directed only toward higher manageability.

In summary, in accordance with the present invention, the steering ratio of front and rear wheels is selected to be greater in a predetermined low vehicle speed range than in a range which is lower than the former. This not only suppresses the change in the radius of a turn relative to the operation of a steering wheel to an adequate degree, but also prevents a rear portion of a vehicle from projecting noticeably in the event of the start of the vehicle. Hence, the vehicle achieves an improved sharp small turn capability in a low vehicle speed range wherein a vehicle is usually steered by great angles. For example, the operator parked the vehicle can start the vehicle while steering it by a great angle and then steer it in the opposite direction by a great angle, so that the manageability of the vehicle is signifiantly enhanced.

The particular range for increasing the steering ratio is selected to be the range immediately preceding the vehicle speed at which the motion of a vehicle becomes dynamically active during acceleration. Hence, even when the rear wheels are steered by a great angle, the vehicle is prevented from turning sharply in the event of deceleration or from becoming jerky during deceleration and acceleration. The operator, therefore, can steer the vehicle with ease and stability.

In addition, if an arrangement is so made as to prevent the steering ratio from increasing excessively during deceleration in the low vehicle speed range, the yaw rate of the vehicle will be successfully prevented from abruptly increasing during deceleration. This is successful in further promoting smooth steering operations.

Various modifications will become possible for those skilled in the art after receiving the teachings of the present disclosure without departing from the scope thereof.

What is claimed is:

1. A method for steering of a four wheel steering vehicle having steerable front and rear wheels, a steering ratio existing between the front and rear wheels which is determined by dividing a steering angle of the rear wheels by a steering angle of the front wheels, and the rear wheels being steered in the opposite direction to the front wheels in a low vehicle speed range by a predetermined steering ratio relative to the steering angle of the front wheels in matching relation to a vehicle speed, comprising the steps of:

in a first low vehicle speed range of said low vehicle speed range, steering the rear wheels by a first steering ratio relative to a steering angle of the front wheels; and in a predetermined second low vehicle speed range of said low vehicle speed range which is higher than said first low vehicle speed range, steering the rear wheels by a second steering ratio greater than said first steering ratio of said first low vehicle speed range.

2. A method as claimed in claim 1, wherein during deceleration of the vehicle said second steering ratio, in said predetermined second low vehicle speed range, is controlled to have a value substantially equal to that of said first steering ratio of said first low vehicle speed range.

* * * * *